United States Patent
Bellala et al.

(10) Patent No.: US 10,643,138 B2
(45) Date of Patent: May 5, 2020

(54) PERFORMANCE TESTING BASED ON VARIABLE LENGTH SEGMENTATION AND CLUSTERING OF TIME SERIES DATA

(71) Applicant: Hewlett Packard Enterprise Development LP, Houston, TX (US)

(72) Inventors: Gowtham Bellala, Palo Alto, CA (US); Mi Zhang, Palo Alto, CA (US); Geoff M. Lyon, Half Moon Bay, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 557 days.

(21) Appl. No.: 15/325,786

(22) PCT Filed: Jan. 30, 2015

(86) PCT No.: PCT/US2015/013759
§ 371 (c)(1),
(2) Date: Jan. 12, 2017

(87) PCT Pub. No.: WO2016/122591
PCT Pub. Date: Aug. 4, 2016

(65) Prior Publication Data
US 2017/0147930 A1     May 25, 2017

(51) Int. Cl.
*G06N 5/04*     (2006.01)
*G06N 20/00*    (2019.01)

(52) U.S. Cl.
CPC ............ *G06N 5/04* (2013.01); *G06N 20/00* (2019.01)

(58) Field of Classification Search
CPC ............ G06N 5/04; G06N 20/00; G06N 3/08; G06N 5/022; G06F 11/3452; G06F 11/3409; G06F 16/35
See application file for complete search history.

(56) References Cited

U.S. PATENT DOCUMENTS

| 2008/0319951 | A1  | 12/2008 | Ueno et al. |
| 2011/0258044 | A1* | 10/2011 | Kargupta ............... G06Q 10/08 705/14.49 |

(Continued)

FOREIGN PATENT DOCUMENTS

| WO | WO-2010083562    | 7/2010 |
| WO | WO-2013170129 A1 | 5/2013 |

OTHER PUBLICATIONS

Bakker, J ; "Handling Abrupt Changes in Evolving Time-series Data" 2012; 134 pages; http://alexandria.tue.nl/textra2/740215.pdf.

(Continued)

*Primary Examiner* — Paulinho E Smith

(57) ABSTRACT

Performance testing based on variable length segmentation and clustering of time series data is disclosed. One example is a system including a training module, a performance testing module, and an interface module. The training module generates a trained model to learn characteristics of a system of interest from training time series data by segmenting the training time series data into homogeneous windows of variable length, clustering the segments to identify patterns, and associating each cluster with a cluster score. The performance testing module analyzes system characteristics from testing time series data by receiving the testing time series data, and determining a performance metric for the testing time series data by analyzing the testing time series data based on the trained model. The interface module is communicatively linked to the performance testing module, and provides the performance metric via an interactive graphical user interface.

18 Claims, 14 Drawing Sheets

(56) References Cited

U.S. PATENT DOCUMENTS

| | | |
|---|---|---|
| 2011/0282828 A1 | 11/2011 | Precup et al. |
| 2012/0290513 A1 | 11/2012 | Frank et al. |
| 2013/0027220 A1* | 1/2013 | Marwah .................. H04Q 9/00 340/870.16 |
| 2014/0108324 A1 | 4/2014 | Chen et al. |

OTHER PUBLICATIONS

Berkhin, P, "A Survey of Clustering Data Mining Techniques", Grouping Multidimensional Data, 2006.

Cheboli, D; "Anomaly Detection of Time Series"; May 2010; 83 pages; http://conservancy.umn.edu/bitstream/handle/11299192985/1/Cheboli_Deepthi_May2010.pdf%C2%A0?sequence=1).

Fraley, C et al, "mclust Version 4 for R: Normal Mixture Modeling for Model-Based Clustering, Classification and Density Estimation", Jun. 2012.

Keogh, E et al, "Segmenting Time Series: A Survey and Novel Approach", 2004.

Liao, W, T., "Clustering of Time Series Data—A Survey", Pattern Recognition, 2005.

Manso, P.M et al, "Package TSclust" Dec. 2014.

Ratanamahatana et al, "Mining Time Series Data", 2010.

\* cited by examiner

PERFORMANCE TESTING BASED ON VARIABLE LENGTH SEGMENTATION AND CLUSTERING OF TIME SERIES DATA

BACKGROUND

Analysis of time series data generated by a system may provide operational insight into the system. A time-series signal may be segmented into windows of constant size, and the resulting windows may be clustered to determine any unique patterns.

DETAILED DESCRIPTION

Figure 1:
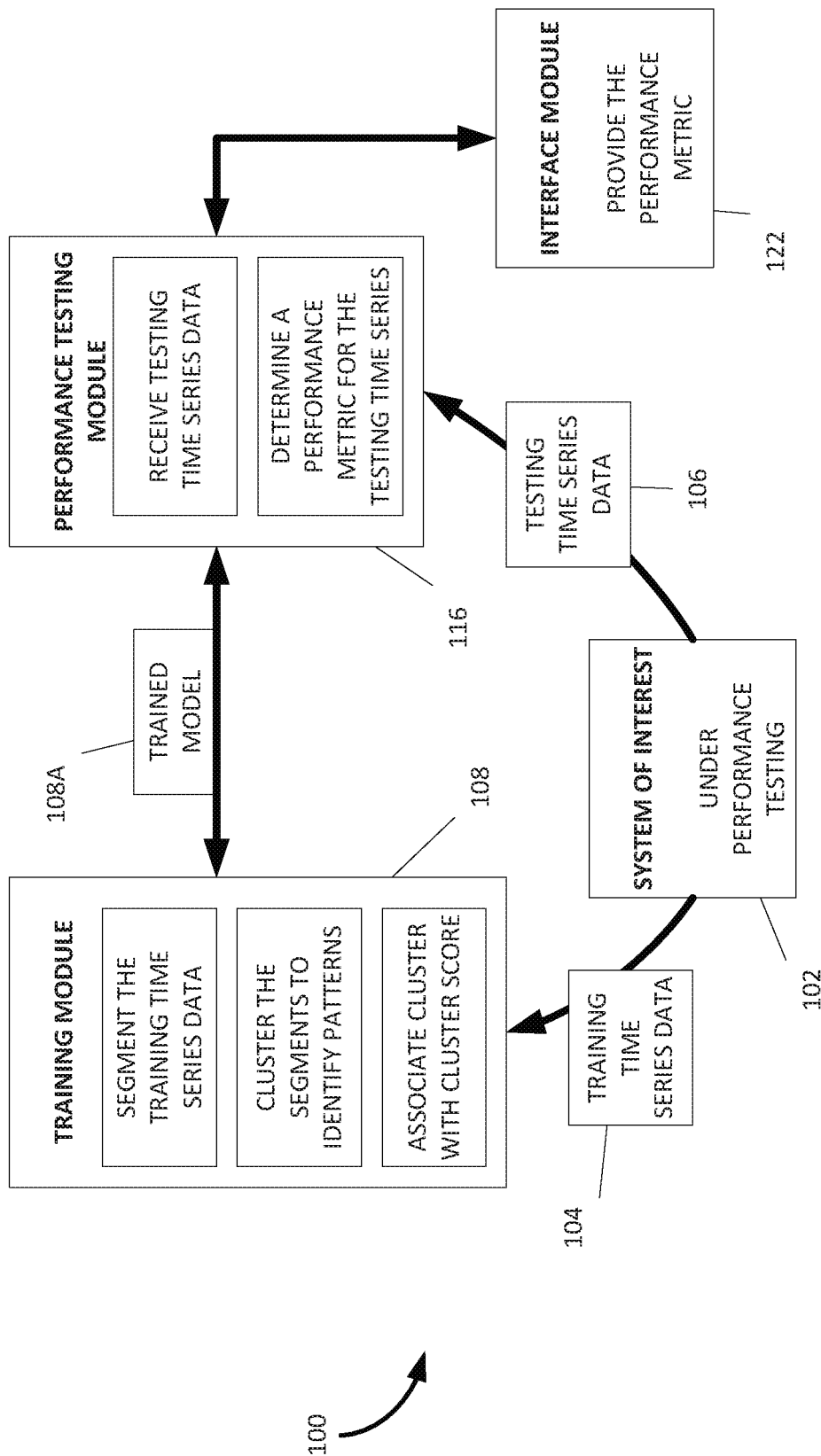
FIG. 1 is a functional block diagram illustrating one example of a system for performance testing based on variable length segmentation and clustering of time series data.

Quantifying behavioral and/or operational characteristics of a system of interest or an entity is important and applicable in several situations such as in-flight turbulence severity and duration analyses, traffic flow observation and management, and equipment operational performance and degradation monitoring. With a growth of Internet-of-things, this problem of providing real-time insights on the performance of a physical system (or "things") has become even more relevant and feasible.

For example, in the automotive space, the ability to analyze time-series sensor data and provide a single, comprehensive performance score quantifying the driving behavior may be especially useful to auto insurance companies to identify good vs. bad drivers, which, in turn, may enable the provision of targeted highly personalized insurance quotations. As another example, logistics companies may be able to identify driver fatigue in a timely manner that may help reduce accidents and further facilitate scheduling policies of the logistics companies.

The problem of automatically uncovering interesting patterns from historical data has been studied in data mining and machine learning, using techniques such as clustering. In traditional time-series clustering techniques, a time-series signal may be segmented into windows of constant size, and the resulting windows may be clustered to determine any unique patterns. However, determining an appropriate window size is often challenging, especially for highly variable/dynamic time series signals, where a large window size may mask important short-term patterns (such as rapid acceleration or hard braking in the automotive use case), while a shorter window size may result in the loss of a global view of the signal thereby morphing the inherent patterns, and introducing spurious patterns. As described herein, this problem may be resolved by performing clustering on variable length partitions of the time-series, where the appropriate time windows may be automatically extracted using time-series segmentation.

Generally, traditional clustering techniques generally work with constant size data elements, such as, for example, vectors of equal length. For example, clustering techniques such as k-means are designed to handle equal length vectors. Some clustering techniques such as time warping are generally deployed to aid in variable length segmentation comparisons, often with mixed results, especially when dealing with segments of highly differing lengths. Therefore, there is a need to enable traditional clustering techniques to work with unequal length elements. As described herein, this cluster comparison problem may be solved by employing durational partitioning of the segments by their respective time lengths, as a pre-processing step, prior to performing the cluster analysis. This results in an improved clustering assignment result, which is further grouped into similar behavioral clusters, irrespective of the durational partitions. For example, in an automotive scenario, the resultant clusters provide an improved set of clusters that segment each vehicular journey into a sequence of distinct behavioral periods.

Further, such an approach may be extended to automate the durational partitioning of the time-series data prior to clustering. This allows the approach to be generalized and applied to other use cases, and allows the technique to auto-cluster, irrespective of the relative time-lengths observed as a result of the initial segmentation.

Existing methods generally employ a set of simple, pre-determined rules to quantify the performance of a system. Such existing solutions rely on a limited set of simplistic, pre-determined, generic rules to characterize the driving behavior (for example, rules that check against given speed, acceleration or braking thresholds). There is a need to remove such a restriction to a pre-determined rule set, and provide flexibility to personalize the rules to each individual system (e.g., to each individual vehicle and/or driver of a vehicle). Accordingly, the proposed solution, as described herein, takes a data-driven, black-box approach to uncover a variety of behavioral and/or operational patterns from historical time-series data, and determine a score-based performance metric.

One example of such a system and method is described in an automotive context, where data collection, storage and algorithmic processing may be performed on an in-situ edge node, and results of the analyses may be forwarded to a centralized mother node. The proposed approach may be scaled out, for example, to a wide fleet of vehicles. The analyses described herein may be deployed on a secured network to enhance restricted data access and data privacy. However, the automotive example is for illustrative purposes only. The systems and methods may be applied to quantify behavioral and/or operational characteristics of any system or entity for which time series data may be available.

As described in various examples herein, performance testing based on variable length segmentation and clustering of time series data is disclosed. One example is a system including a training module, a performance testing module, and an interface module. The training module generates a trained model to learn characteristics of a system of interest from training time series data by segmenting the training time series data into homogeneous windows of variable length, clustering the segments to identify patterns, and associating each cluster with a cluster score. The performance testing module analyzes system characteristics from testing time series data by receiving the testing time series data, and determining a performance metric for the testing time series data by analyzing the testing time series data based on the trained model. The interface module is communicatively linked to the performance testing module, and provides the performance metric via an interactive graphical user interface.

As described herein, two modules may be utilized to generate the performance metric. Generally, the first module may correspond to an offline training module, where the behavioral or operational characteristics of a system of interest may be learned from training data. The second module may be a real-time performance testing module that performs a comprehensive analysis of the time-series data in real-time using the trained model, to provide a single, performance score.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for system for performance testing based on variable length segmentation and clustering of time series data. The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network.

The components of system 100 may be computing resources, each including a suitable combination of a physical computing device, a virtual computing device, a network, software, a cloud infrastructure, a hybrid cloud infrastructure that includes a first cloud infrastructure and a second cloud infrastructure that is different from the first cloud infrastructure, and so forth. The components of system 100 may be a combination of hardware and programming for performing a designated function. In some instances, each component may include a processor and a memory, while programming code is stored on that memory and executable by a processor to perform a designated function.

The computing device may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform an interactive detection of system anomalies. Computing device may include a processor and a computer-readable storage medium.

The system 100 generates a trained model to learn characteristics of a system of interest from training time series data by segmenting the training time series data into homogeneous windows of variable length, clustering the segments to identify patterns, and associating each cluster with a cluster score. The system 100 analyzes system characteristics from testing time series data by receiving the testing time series data, and determining a performance metric for the testing time series data by analyzing the testing time series data based on the trained model. The system 100 provides the performance metric via an interactive graphical user interface.

System 100 includes a training module 108, a performance testing module 116, and an interface module 122. The training module 108 may receive training time series data 104 from a system of interest 102 under performance testing. The term "performance testing" as used herein generally refers to analysis of system characteristics from performance data such as, for example, time series data. In some examples, system of interest 102 may be an entity. In some examples, the system of interest 102 may be a vehicle and/or a driver of a vehicle. In some examples, training time series data 104 may be time-series data collected from a vehicle to analyze and provide a performance score evaluating driving behavior. In some examples, the characteristics of the system of interest 102 may include one of operational and behavioral performance of the system of interest 102.

The training module 108 may generate a trained model 108A to learn characteristics of a system of interest 102 from training time series data 104 by segmenting the training time series data 104 into homogeneous windows of variable length. A homogeneous window usually refers to a window with comparable values—more precisely, whose values are within a certain threshold of deviation. Homogeneity may be applied on the training time series data 104, and/or on some derivative of the training time-series data 104 such as slope, etc. As an example, a time-series segmentation algorithm may identify segments with variance for road speed values within a given threshold, say a threshold of 10%. As another example, a time-series segmentation algorithm may identify segments with variance for the slope of road speed values within a given threshold, say a threshold of 10%.

For a given time series signal, one of the goals of segmentation is to partition the time-series into distinct internally homogenous sections. Several criteria, such as variance within a segment and/or error in piecewise linear approximation, may be used to identify the optimal partitioning of the time-series signal. For a given criterion, there may be several approaches for time series segmentation, including sliding window, top-down, and bottom-up. As described herein, in some examples, a greedy bottom-up algorithm may be utilized that achieves results with relatively low complexity.

The training module 108 may cluster the segments to identify patterns. For example, a set of segments with different patterns may be extracted. Similar segments may be clustered to identify unique patterns and/or signatures in the segments, where each unique pattern may correspond to a cluster. Clustering techniques such as k-means or k-medoids may be applied to identify such clusters, where the value of "k" (i.e., the number of clusters) may be selected by optimizing statistical measures such as Bayesian information criterion ("BIC"), Calinsky-Harabasz index, C-index, and so forth.

Clustering techniques generally require computation of a similarity or distance measure (such as Euclidean distance) between every pair of segments. Given that the segments may be of different lengths, it may not be straight forward to compute a distance measure. One approach, an interpolation technique, to compare segments of unequal length may be to either interpolate the shorter segment or aggregate the longer segment, or some combination thereof, such that the two segments may be converted to equal length. Another approach may be to use distance measures such as Dynamic Time Warping ("DTW") to compare time series of unequal length. However, such approaches may bias the distance measure especially for segments whose lengths may vary greatly. In addition, such approaches fail to capture patterns corresponding to shorter segments. As described herein, two potential approaches may be applied to address this problem.

Segment Categorization

Segment categorization is a technique of categorizing segments into various bins based on their respective lengths of segments. As an example, the set of segments may be divided into three categories corresponding to segments of length 5-12 seconds, 12-30 seconds, and 30-45 seconds. The segments within each category may be then clustered separately, by using, for example, the interpolation technique to convert segments within a category to be of same length. This approach may avoid comparison of a short segment with a very long segment, thereby reducing the bias introduced by interpolation. The categories may either be manually selected (via an interactive graphical user interface) and/or automatically estimated by fitting a Gaussian mixture model ("GMM") on the segment lengths, where the number of categories may be selected by optimizing a Bayesian information criterion.

Feature Space Transformation

Feature space transformation is a technique that maps variable length time-segments into an equal length feature space. As an example, the time-segments may be mapped into an equal length frequency distribution space, where a histogram of the attribute values in a given time segment may be extracted. Similarly, spectral transformation (e.g., Fourier transform, Wavelet transform) may be used as an alternative equal length feature space. Alternatively, a specific set of features that capture the dynamics (e.g., autocorrelations) and the statistical properties (e.g., mean, variance) of these segments may be extracted.

The training module 108 may associate each cluster with a cluster score. For example, once the clusters are identified, each cluster may be assigned a cluster score that defines the goodness of a behavioral or operational pattern represented by the cluster. In some examples, each cluster may be assigned a cluster score range that may further enable fine-tuning of the cluster scores assigned to segments within a cluster. In some examples, such cluster scores may be obtained from a domain expert, via an interactive graphical interface. In some examples, automated techniques may be utilized to generate recommended cluster score ranges for each cluster.

A domain is an environment associated with the system of interest 102, and a domain expert is a system or entity with semantic and/or contextual knowledge relevant to aspects of the domain.

In some examples, associating each cluster with the cluster score may further include associating each cluster with labeled data. In some examples, labeled data may be related to a list of selected attributes, cluster properties, and/or cluster scores for each cluster. For example, the domain may be a retail store, and the domain expert may have knowledge about traffic patterns in the store, customer purchases, product placement, products sold, available inventory, clientele, store hours, and so forth. As another example, the domain may include automotive data, and the domain expert may be an insurance adjuster of an auto insurance company, a scheduler for a logistics company, and so forth.

In some examples, the training module 108 may pre-process the testing time series data based on one of data interpolation, data imputation, feature sub-selection, data fusion, validation, estimation, and editing. For example, training time series data 104 related to a system of interest may be obtained from a single or multiple sources. In some examples, to facilitate multivariate analysis, data interpolation may be performed on the training time-series data 104 to account for asynchronous data sampling, and/or to synchronize multiple data signals. Various interpolation techniques such as linear interpolation, piecewise polynomial interpolation, and/or Gaussian regression models among others may be utilized. Data imputation may be performed to replace missing values in data elements with substitute values. Generally, data imputation may be performed to make data elements relevant for statistical analysis, since data elements with missing values may be discarded otherwise. In some examples, outliers and/or invalid values may be removed. Data fusion is a technique of merging (or "joining") data from multiple sources. The resulting time-series data may be cleaned and pre-processed.

In some examples, feature sub-selection may be performed to identify and retain relevant features of the data. For example, time series data may include redundant and/or irrelevant features that may interfere with analysis of the data. Feature sub-selection removes redundant and/or irrelevant features in the pre-processing step. Feature sub-selection may be performed in a supervised, semi-supervised, and/or unsupervised manner.

Validation is a technique that adds restrictions on types of data elements that may be included for analysis. Such a technique prevents use of data that may be invalid. Validation may be performed in a supervised, semi-supervised, and/or unsupervised manner. For example, a domain expert may validate data elements via a computing device. Also, for example, training module 108 may include a set of rules to automatically validate data. Estimation is a technique to estimate time series parameters for the time series data. Generally, estimation is performed to identify outliers (e.g., abnormal observations) in the time series data. Outliers are data elements that deviate from a norm of a statistical distribution of data elements. Generally, outliers may cause abnormalities in time series data. In some examples, such outliers may cause parameter estimation values to be subjective. Identification, isolation, and/or elimination of outliers allows for estimation of time series parameters. Editing time series data is a technique to modify attributes associated with the time series data. In some examples, editing may be performed for better scaling and/or visualization of the time series data. For example, the horizontal and/or vertical scales for the time series data may be edited. In some examples, editing may be performed to correct errors in the time series data.

In some examples, the training module 108 may perform variable selection. For example, the processed time-series may be analyzed to select a final set of variables to be used in the analysis. Variable selection may help reduce complexity of the resulting analysis, by identifying a smaller set of variables (or attributes) that may capture a large amount of the information from the original set. As described herein, several criteria may be used to down-select the variables of interest. For example, attributes with a significant amount of missing data may be removed. Also, for example, attributes with a low standard deviation (for example, constant variables) may be removed as they may be less informative. As another example, attributes with a high-correlation may be identified to remove redundancies.

The output of the training module 108 may correspond to a trained model 108A that may include a list of selected attributes, cluster properties (mean, and co-variance matrix for each cluster), and score ranges for each cluster.

The performance testing module 116 analyzes system characteristics from testing time series data 106. The performance testing module 116 accesses the trained model 108A to provide a real-time performance score that may quantify the behavioral and/or operational characteristics for the system 102 of interest.

The performance testing module 116 may receive the testing time series data 106. As described herein, the testing time series data 106 may be pre-processed, such as, for example, by data fusion, validation, estimation, and/or editing. The testing time series data 106 may be merged, imputed, cleaned for outliers, and/or interpolated. Also, for example, the testing time series data 106 may be analyzed to select a final set of variables to be used in the analysis, by performing variable selection. In some examples, the performance testing module 116 may generate additional segments. For example, the testing time series data 106 may be segmented using a segmentation algorithm, as described, for example, with reference to the training module 108, to identify homogenous time windows.

In some examples, the performance testing module 116 may associate each additional segment with a training cluster in the trained model 108A. For example, the additional segments may be assigned to a closest cluster, based on the Euclidean distance in the feature space used in the trained model, and the closest cluster may be identified as the training cluster. In instances where segment categorization may be used as part of clustering, the additional segments may be first assigned to an appropriate category, and then mapped to a closest cluster within that category. In some examples, an additional segment may be identified as anomalous ("new/unseen pattern") if its distance to the closest cluster is above a certain threshold.

In some examples, the performance testing module 116 may associate each additional segment with a segment score based on the cluster score for the associated training cluster. The segment score is a numerical value associated with the additional segment. For example, the segment score may be the cluster score for the cluster associated with the additional segment. For example, once the additional segments are assigned to a cluster, a segment score may be determined for each additional segment. In the case where each cluster is assigned a score range, the segment score assigned to each additional segment within a cluster may be further fine-tuned based on the operational characteristics of another variable/attribute, as further described herein.

In some examples, the performance testing module 116 may determine a performance metric for the testing time series data 106 by analyzing the testing time series data 106 based on the trained model 108A. In some examples, the performance metric for the testing time series data 106 may be a real-time performance score of the system. The performance metric is based on a comprehensive analysis of the time-series data in real-time using the trained model 108A. In some examples, the performance metric may be a single, comprehensive performance score quantifying driving behavior.

In some examples, the performance metric for the testing time series data 106 may correspond to a weighted aggregate of individual segment scores. As an example, the individual segments may be weighted based on their length (which may translate to operational duration of the system in that state). Formally, let C denote the set of all segments, and $L_S$ be the length of segment S, then, the overall performance metric may be computed as:

$$\frac{\sum_{S \in C} SegmentScore_S * L_S}{\sum_{S \in C} L_S} \qquad \text{(Eqn. 1)}$$

where $SegmentScore_S$ is the segment score associated with additional segment S and $L_S$ is the length of additional segment S.

System 100 includes an interface module 122, communicatively linked to the performance testing module 116, to provide the performance metric via an interactive graphical user interface. For example, a single, performance metric may be provided for a system of interest 102 (and/or an entity) under performance testing. For example, the performance metric may be a single, comprehensive performance score quantifying the driving behavior, and such a scorecard may be provided by the interface module 122 via the interactive graphical user interface. In some examples, the interface module 122 may receive the cluster score from a domain expert via the interactive graphical user interface. In some examples, the interface module 122 may automatically generate the cluster score based on predetermined rules. In some examples, such rules may be set by the domain expert.

Figure 2:
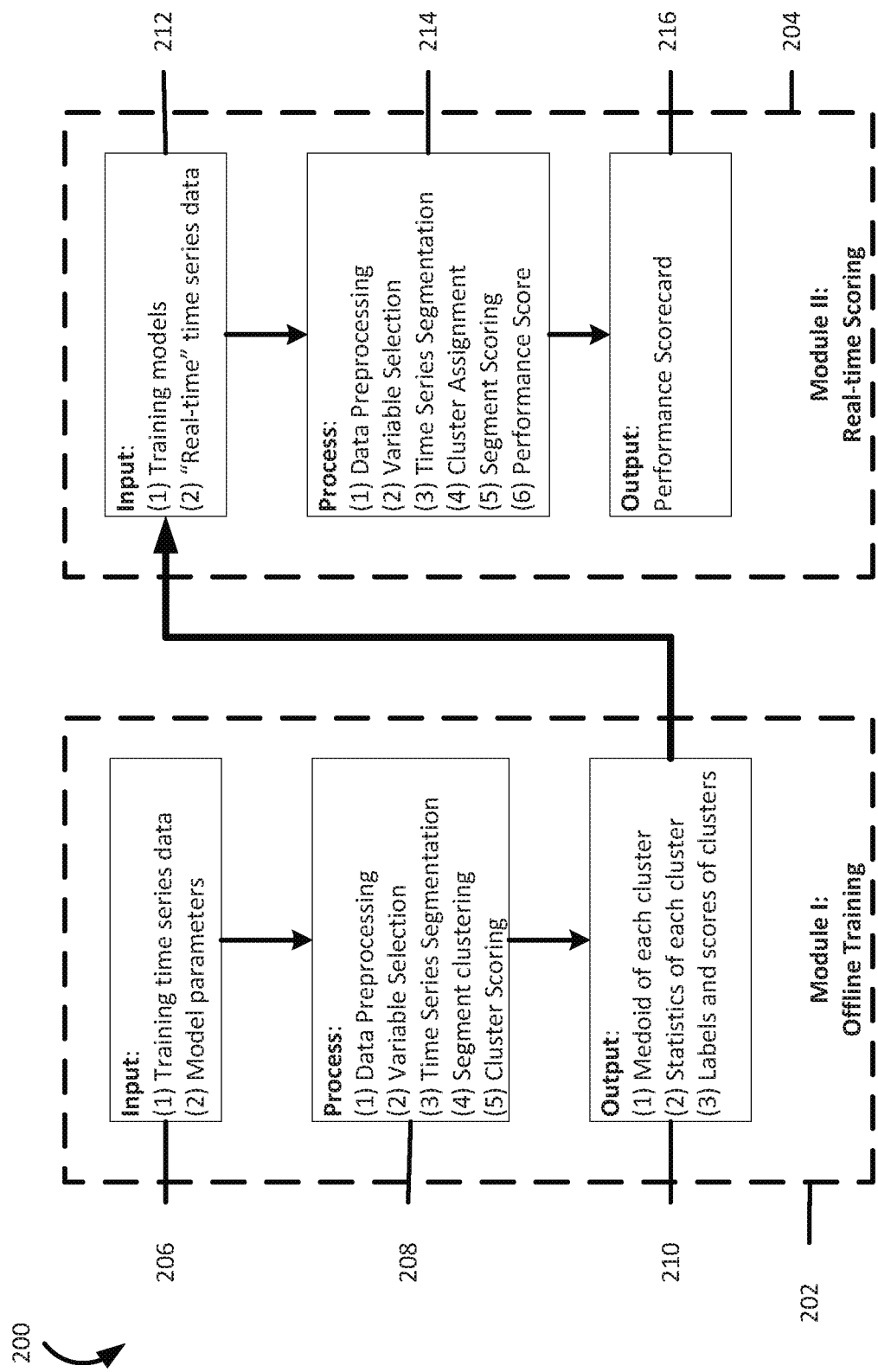
FIG. 2 is another functional block diagram illustrating one example of a system for performance testing based on variable length segmentation and clustering of time series data.

FIG. 2 is another functional block diagram illustrating one example of a system 100 for performance testing based on variable length segmentation and clustering of time series data. Some aspects of FIG. 2 may be described with reference to the system 100 described in FIG. 1. System 200 includes Module I 202 and Module II 204. In some examples, Module I 202 may be an off-line training module. In some examples, Module I 202 may be the training module 108 described with reference to FIG. 1. In some examples, Module II 204 may be a real-time scoring module. In some examples, Module II 204 may be the performance testing module 116 described with reference to FIG. 1.

At 206 of Module I 202, training time series data from a system under performance testing may be received and model parameters for the training time series data may be identified. At 208 of Module I 202, the training time series data may be preprocessed, and variables may be selected.

The training time series data may be segmented, the segments may be clustered, and a cluster score may be determined for each cluster.

At 210 of Module I 202, a trained model may be generated, where the trained model may include a medoid of each cluster, statistics related to each cluster (e.g., when the cluster is based on a Gaussian distribution), and labels and cluster scores for each cluster.

The trained model may be provided to Module II 204. At 212 of Module II 204, trained models may be received and/or accessed. Real-time testing time series data may be received. At 214 of Module II 204, the testing time series data may be preprocessed, and variables may be selected. The testing time series data may be segmented, the segments may be assigned to clusters identified in the trained model, and a segment score may be determined for each cluster, where the segment score is the cluster score for the associated cluster. At 216 of Module II 204, a performance scorecard may be generated and provided to a computing device.

As described herein, the system of interest may be any system for which time series data is available. For illustrative purposes only, the time series data may be data collected from a vehicle to analyze and provide a performance metric evaluating the driving behavior. Such a performance metric may be valuable, for example, to individual users (e.g., drivers) to help improve mileage and/or reduce accidents. As another example, such a performance metric may be valuable to fleet operators (e.g., logistic companies) to better predict driver fatigue that may help prevent accidents. Also, for example, such a performance metric may be valuable to service providers (e.g., insurance and car-rental companies) to identify good and/or bad drivers that may enable improved targeted incentives (e.g., personalized quotes).

In some examples, the time-series data may be gathered from a vehicle via an onboard diagnostics (OBD-II) port. The OBD-II provides access to several important parameters/attributes corresponding to various vehicle sub-systems. For example, the OBD-II system may provide access to 40 different parameters, including but not limited to, speed, engine status, throttle position, and so forth.

In some examples, data may be collected from a vehicle over a period of multiple days (e.g., 60 days). The data may correspond to 36 commutes at different times of day and under various traffic conditions. The data may include over 40 different attributes, where two different sampling rates may be applied to collect such attributes. As an example, attributes such as speed (in mph) that may be highly dynamic and varying, may be sampled at higher sampling rates, while attributes such as engine status, that change less frequently, may be sampled at a lower sampling rate. Also, for example, various time-series data corresponding to different attributes may not necessarily be sampled synchronously.

In some examples, linear interpolation may be utilized to impute missing data as well as to synchronize the various time series. The processed time series may then be subjected to variable selection that reduce the number of variables from 40 to 4, such as engine RPM, road speed, throttle position, and load value. Of these four attributes, driving behavior may be accurately characterized using road speed. Accordingly, time-series segmentation may be performed on time series data for road speed. For each commute, a greedy bottom-up algorithm may be utilized to segment the time series signal, such that the variance within each segment does not exceed a specified threshold. The threshold may be identified as a percentage value rather than an absolute value, as general driving patterns may vary with each driver. More specifically, if $VAR_{road\_speed}$ denotes a variance of the entire commute, then the variance within each segment may be constrained to be below a percentage $p_t$ of the overall variance (i.e., $p_t \times VAR_{road\_speed}$), where $VAR_{road\_speed}$ represents the overall variance for road speed. Using this approach, over 1100 segments for the 36 commutes may be identified in the data set to determine a percentage value of 10%.

Figure 3:
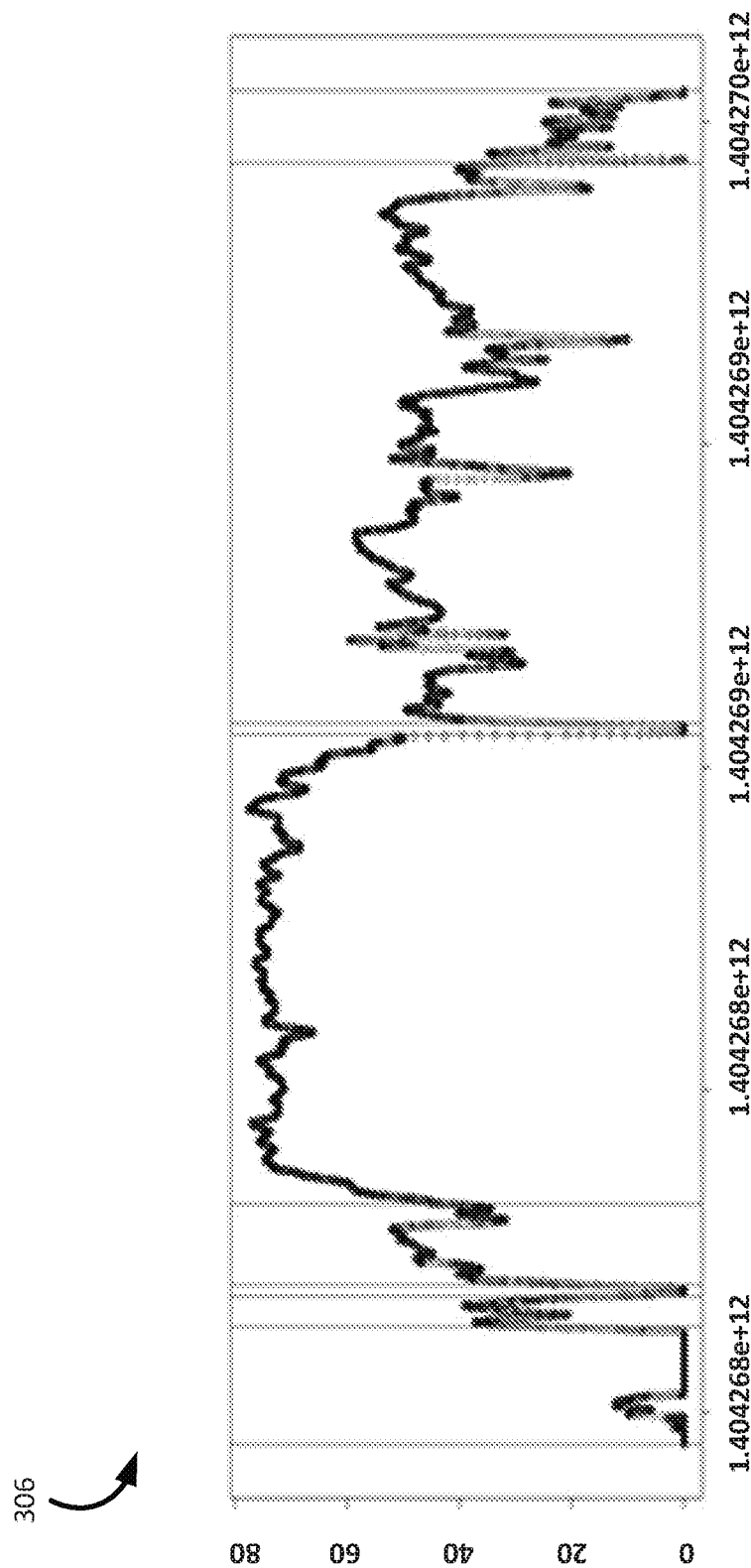
FIG. 3 illustrates an example segmentation of time series data for a vehicle commute.

FIG. 3 illustrates an example segmentation of time series data for a vehicle commute. As illustrated, the y-axis represents speed in miles per hour (mph). The x-axis represents time in a single commute for the vehicle. The portion of the time series data between two successive vertical lines represents a segment.

Figure 4:
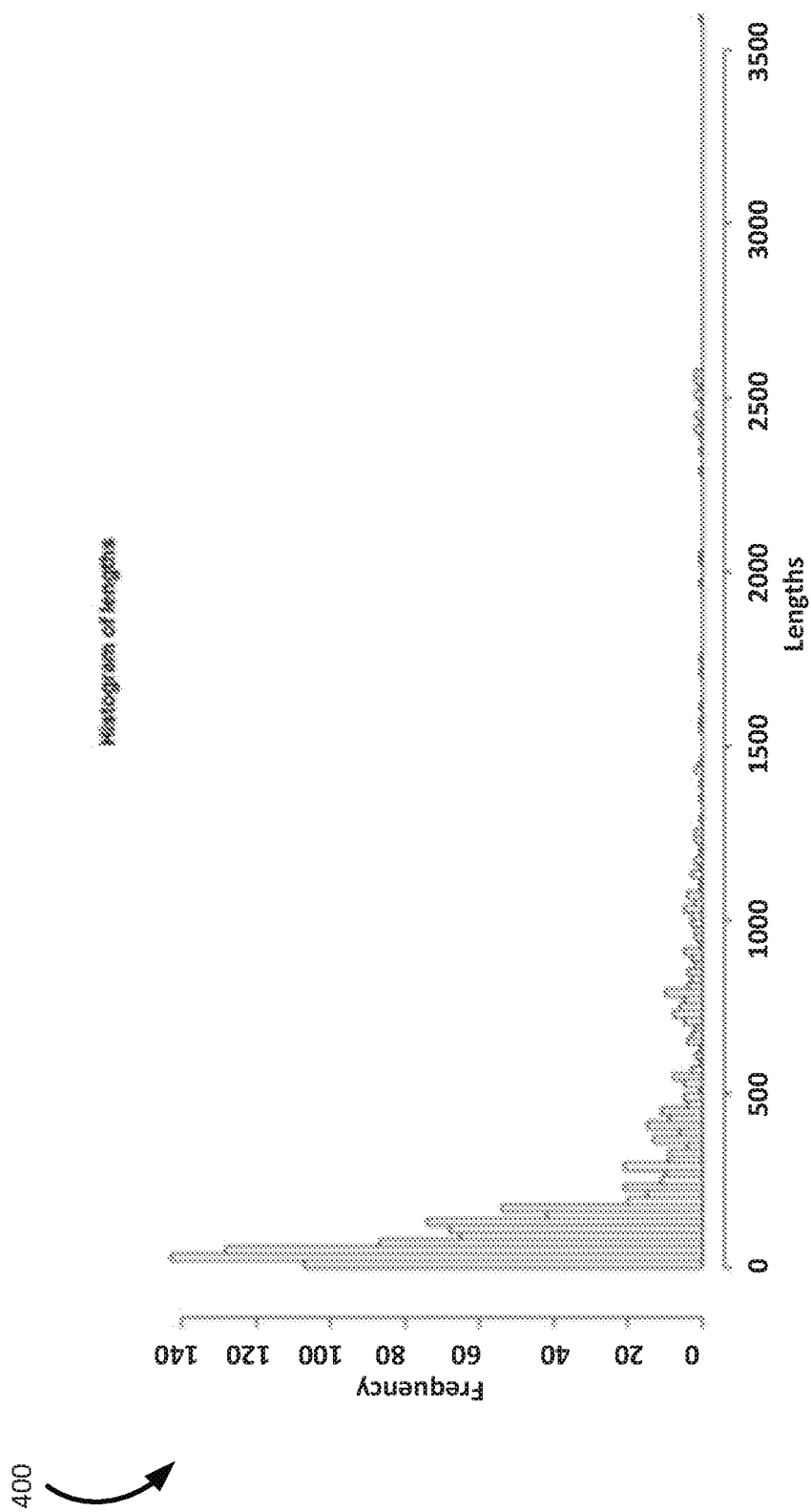
FIG. 4 illustrates an example histogram of segment lengths of a time series.

FIG. 4 illustrates an example histogram of segment lengths of a time series. For example, the segments identified from all the commutes in the training time series data may be categorized into several bins, where the bin characteristics (e.g., bin widths) may be identified by fitting a Gaussian mixture model on the segment lengths. In some examples, an optimal number of bins may be selected using Bayesian information criterion (BIC). In some examples, this may result in 5 bins or categories, corresponding to 0-12 seconds, 12-30 seconds, 30-120 seconds, 120-300 seconds, 300 seconds and above.

The segments within each category may then be clustered using K-means, where the optimal number of clusters may be selected using the cluster variance criterion described herein. Accordingly, three unique clusters within each category may be identified. A range for each cluster score may be determined based on the driving pattern. FIGS. 5-9 illustrate signatures of the three clusters within each of the five bins or categories, and the associated ranges for respective cluster scores.

Figure 5:
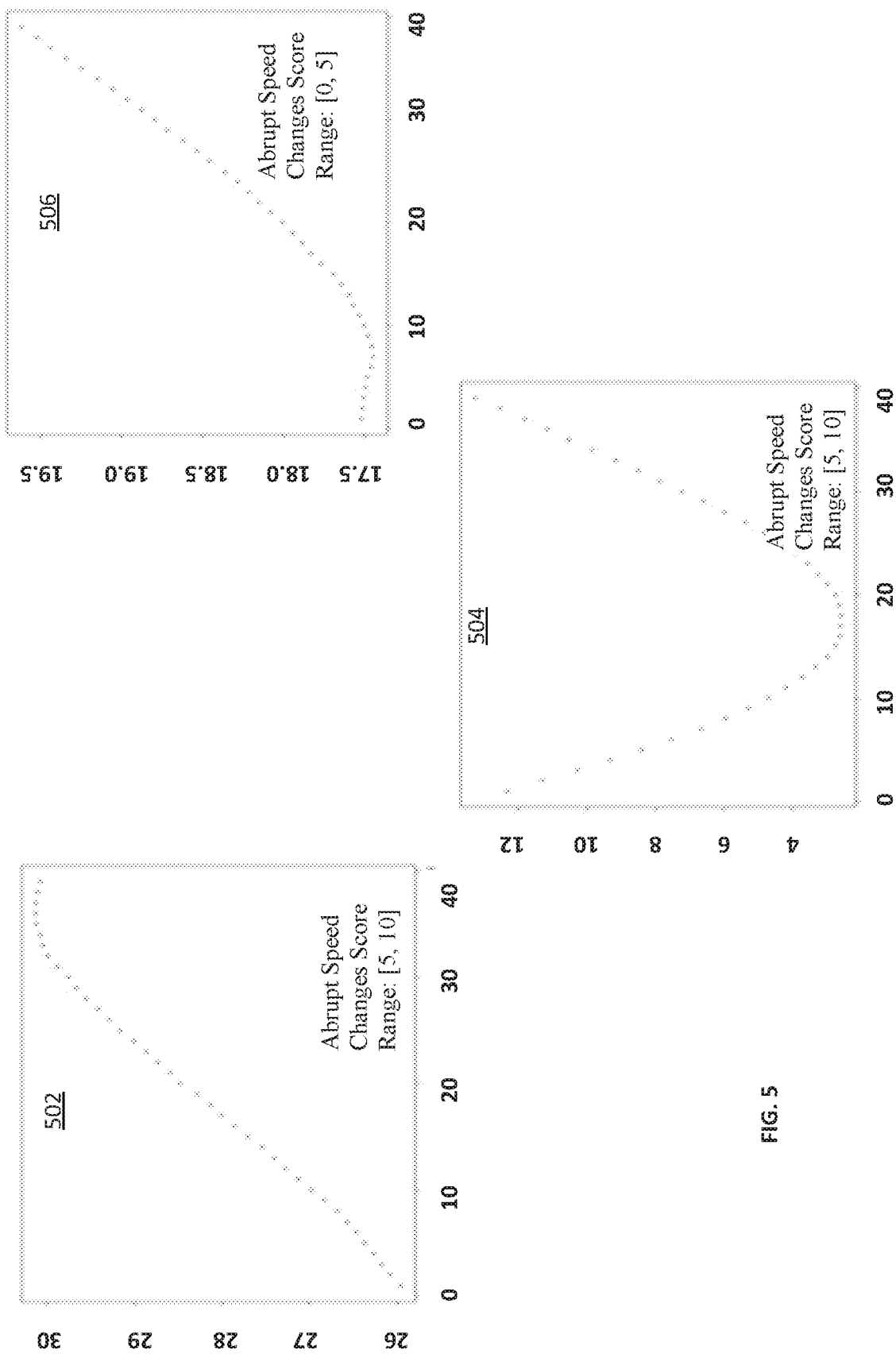
FIG. 5 illustrates example patterns observed in segments of length between 0 and 12 seconds.

FIG. 5 illustrates example patterns observed in segments of length between 0 and 12 seconds. In particular, FIG. 5 illustrates an example cluster medoid corresponding to each pattern. Three unique clusters in the time category of 0 to 12 seconds are illustrated. Cluster 502 corresponds to abrupt speed changes, and may be associated with a cluster score in the range [5, 10]. Cluster 504 corresponds to abrupt speed changes, and may be associated with a cluster score in the range [5, 10]. Cluster 506 corresponds to abrupt speed changes, and may be associated with a cluster score in the range [5, 10].

Figure 6:
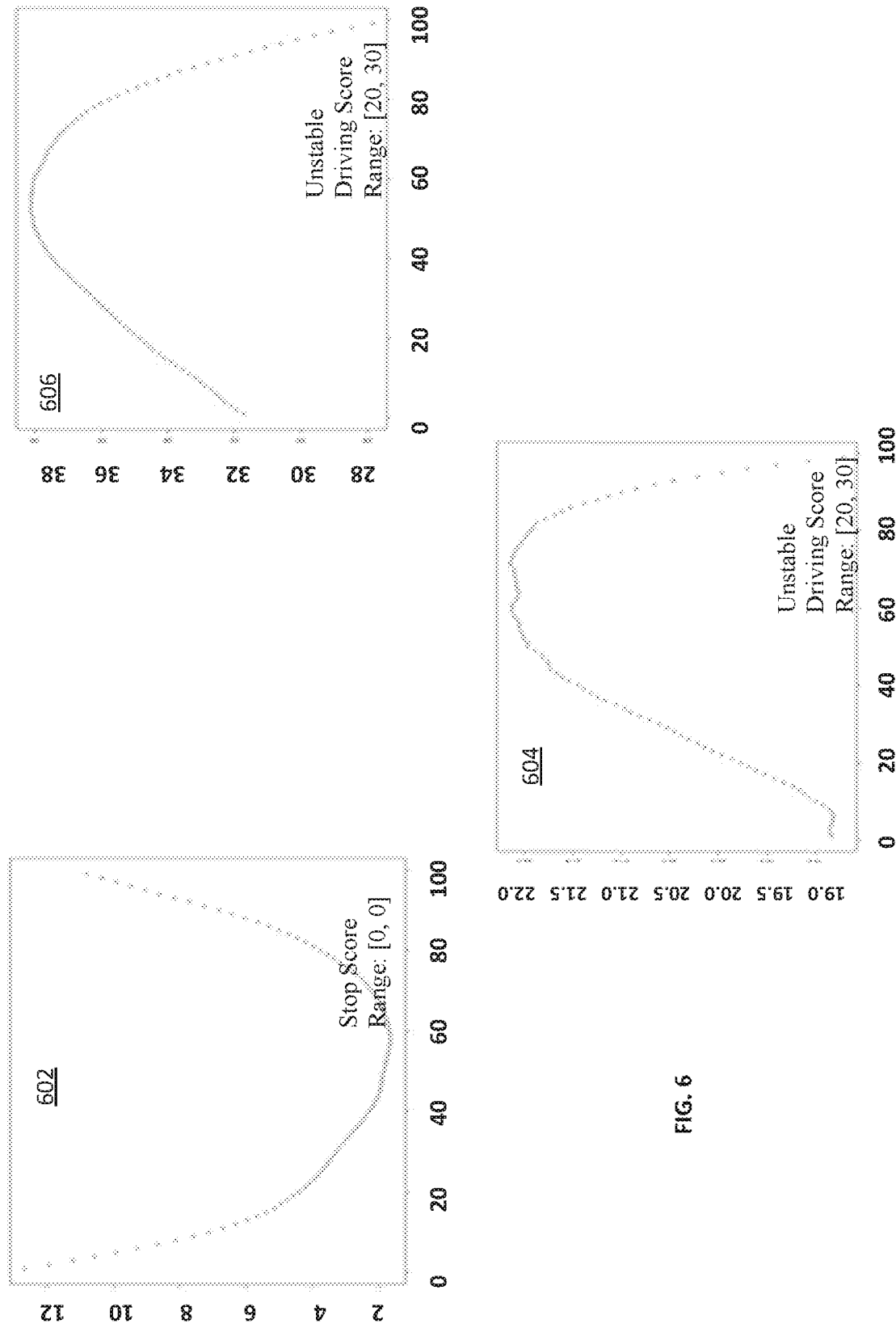
FIG. 6 illustrates example patterns observed in segments of length between 12 and 30 seconds.

FIG. 6 illustrates example patterns observed in segments of length between 12 and 30 seconds. In particular, FIG. 6 illustrates an example cluster medoid corresponding to each pattern. Three unique clusters in the time category of 12 to 30 seconds are illustrated. Cluster 602 corresponds to a stop, and may be associated with a cluster score in the range [0, 0]. Cluster 604 corresponds to unstable driving, and may be associated with a cluster score in the range [20, 30]. Cluster 606 corresponds to unstable driving, and may be associated with a cluster score in the range [20, 30].

Figure 7:
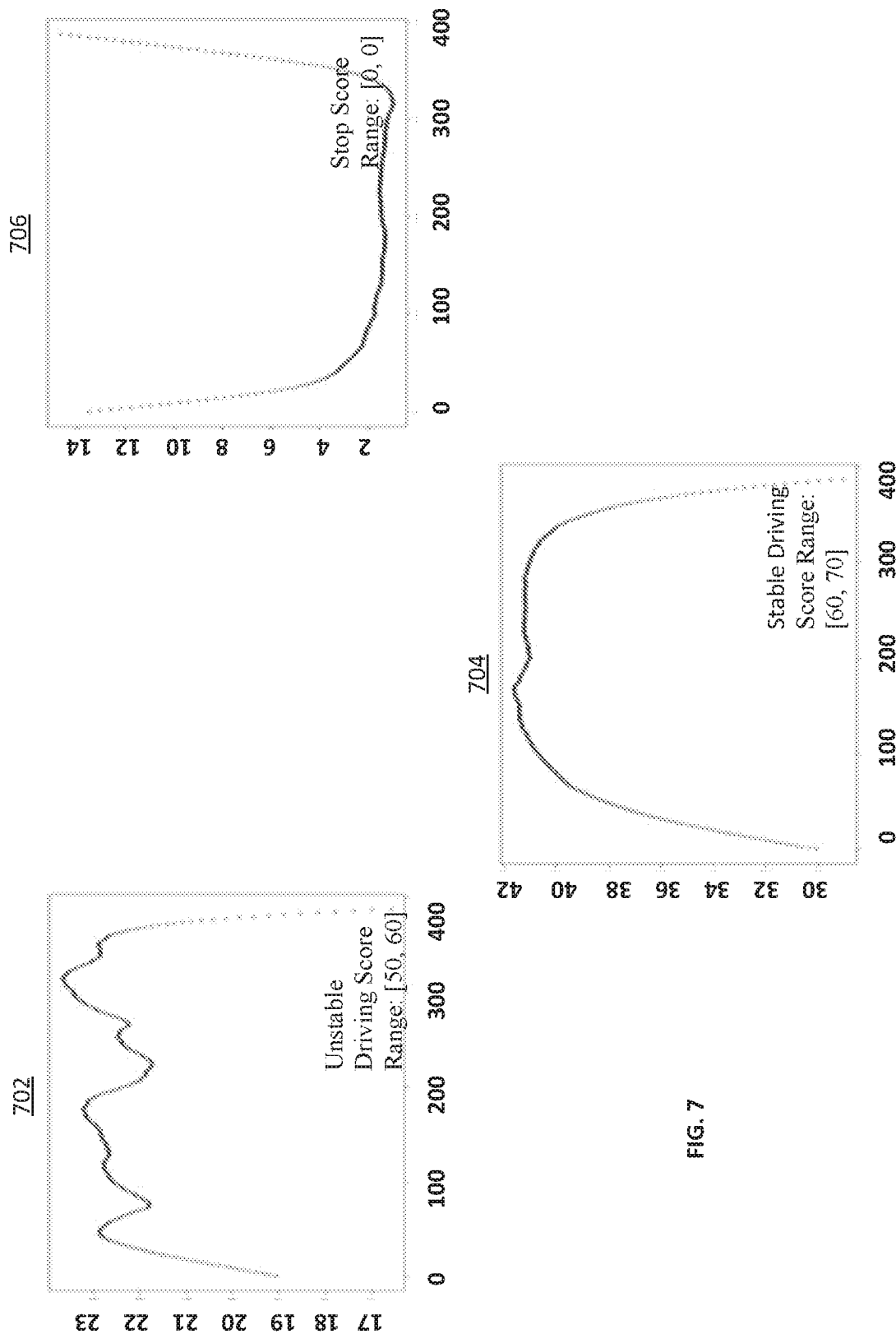
FIG. 7 illustrates example patterns observed in segments of length between 30 and 120 seconds.

FIG. 7 illustrates example patterns observed in segments of length between 30 and 120 seconds. In particular, FIG. 7 illustrates an example cluster medoid corresponding to each pattern. Three unique clusters in the time category of 30 to 120 seconds are illustrated. Cluster 702 corresponds to unstable driving, and may be associated with a cluster score in the range [50, 60]. Cluster 704 corresponds to stable driving, and may be associated with a cluster score in the range [60, 70]. Cluster 706 corresponds to a stop, and may be associated with a cluster score in the range [0, 0].

Figure 8:
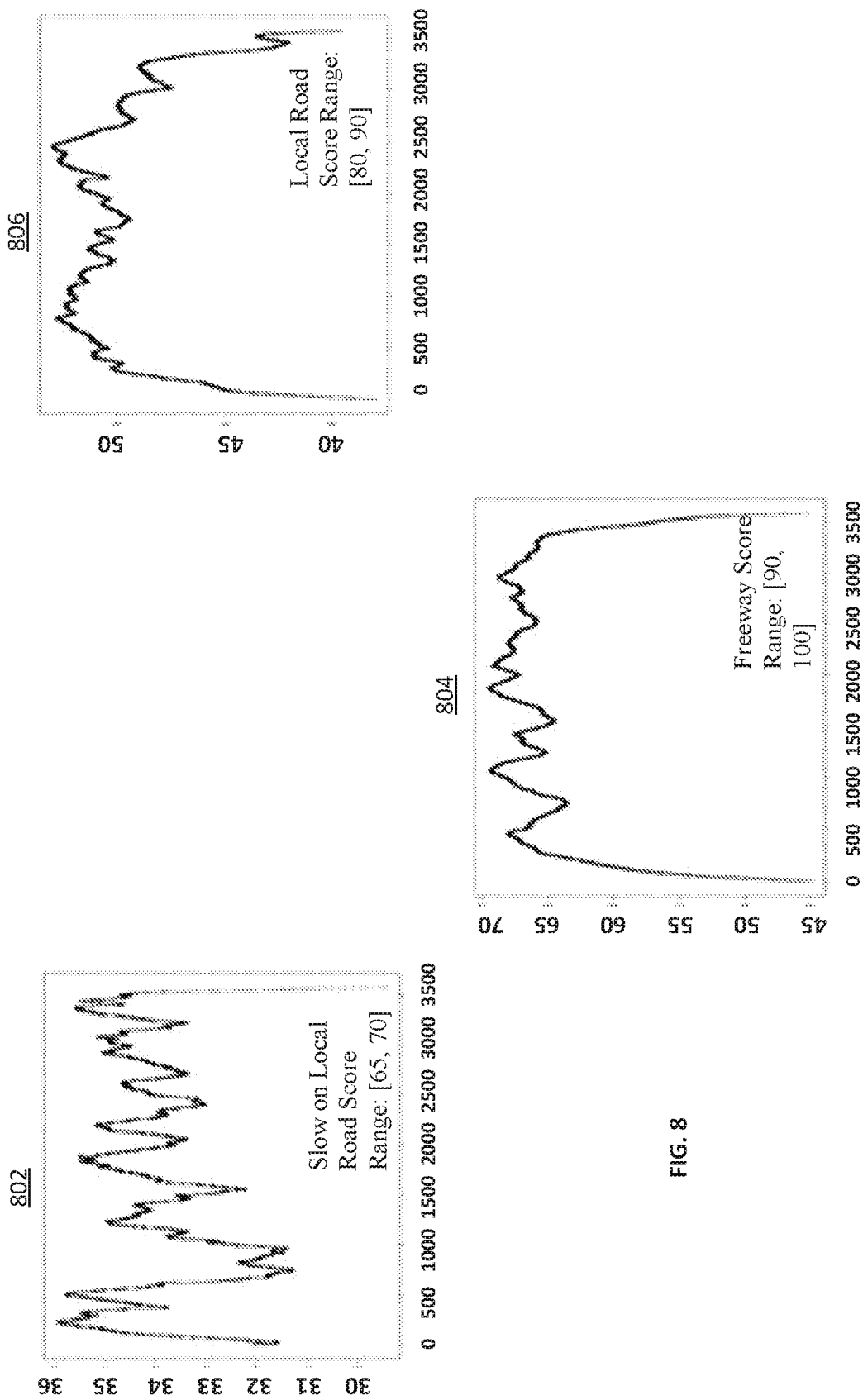
FIG. 8 illustrates example patterns observed in segments of length between 120 and 300 seconds.

FIG. 8 illustrates example patterns observed in segments of length between 120 and 300 seconds. In particular, FIG. 8 illustrates an example cluster medoid corresponding to each pattern. Three unique clusters in the time category of 120 to 300 seconds are illustrated. Cluster 802 corresponds to slow driving on a local road, and may be associated with a cluster score in the range [65, 70]. Cluster 804 corresponds to freeway driving, and may be associated with a cluster score in the range [90, 100]. Cluster 806 corresponds to driving on a local road, and may be associated with a cluster score in the range [80, 90].

Figure 9:
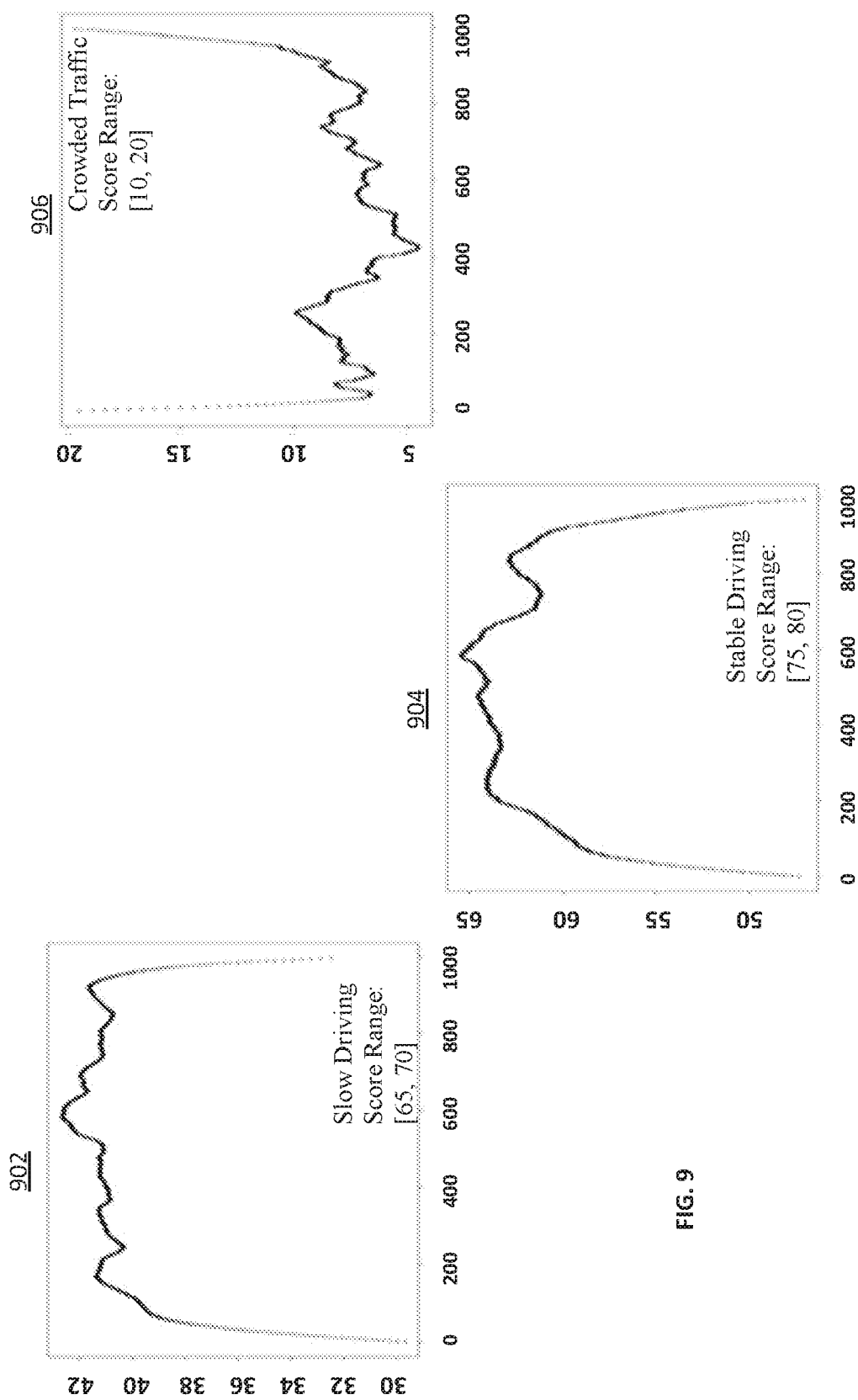
FIG. 9 illustrates example patterns observed in segments that lasted longer than 300 seconds.

FIG. 9 illustrates example patterns observed in segments that lasted longer than 300 seconds. Such segments may be considered to be segments of long-duration. In particular, FIG. 9 illustrates an example cluster medoid corresponding to each pattern. Three unique clusters in the time category of over 300 seconds are illustrated. Cluster 902 corresponds to slow driving, and may be associated with a cluster score in the range [65, 70]. Cluster 904 corresponds to stable driving, and may be associated with a cluster score in the range [75, 80]. Cluster 906 corresponds to driving in crowded traffic, and may be associated with a cluster score in the range [10, 20].

As an example, clusters 502, 504, 506 in FIG. 5 correspond to abrupt speed changes that may be representative of hard braking and rapid acceleration. Accordingly, such clusters were assigned a low range (e.g., [0, 5], [5, 10]) for the cluster score. Also, for example, clusters 902 and 904 in FIG. 9 correspond to smoother, freeway driving (or cruise mode), and were therefore assigned higher ranges for cluster scores (e.g., [65, 70], [75, 80]). As described herein, in some examples, the score ranges may be determined automatically.

In some examples, associating each cluster with a cluster score is based on a variance of a load value. For example, within each cluster, the cluster score assigned to a segment may be further fine-tuned based on the variance of its load value. Within a cluster, segments with lower variance in load value may be assigned higher scores from the cluster score range. Generally, a highly variable load value may be associated with aggressive driving. Formally, let $loadvar_s$ correspond to the variance of load value for a segment s assigned to cluster c. Then, $loadvar_s$ may be assumed to be a Gaussian distribution $loadvar_s \sim N(\mu_c, \sigma_c^2)$, where $\mu_c$ and $\sigma_c$ are the mean and standard deviation of variances in load value among the segments in cluster c from the training data. Let $F(loadvar_s; \mu_c, \sigma_c)$ denote the cumulative probability, and let $[minScore_c, maxScore_c]$ correspond to the range of cluster score for cluster c trained in Module I 202 (of FIG. 2), then, the performance metric for segment s, denoted $Score_s$, may be computed as:

$$Score_s = maxScore_c - (maxScore_c - minScore_c) \times F(loadvar_s; \mu_c, \sigma_c) \quad \text{(Eqn. 2)}$$

As described herein, the scores computed for each segment may be aggregated using a weighted linear combination weighted by segment length (e.g., using Eqn. 1) to compute the overall driving performance score for the given commute.

Figure 10:
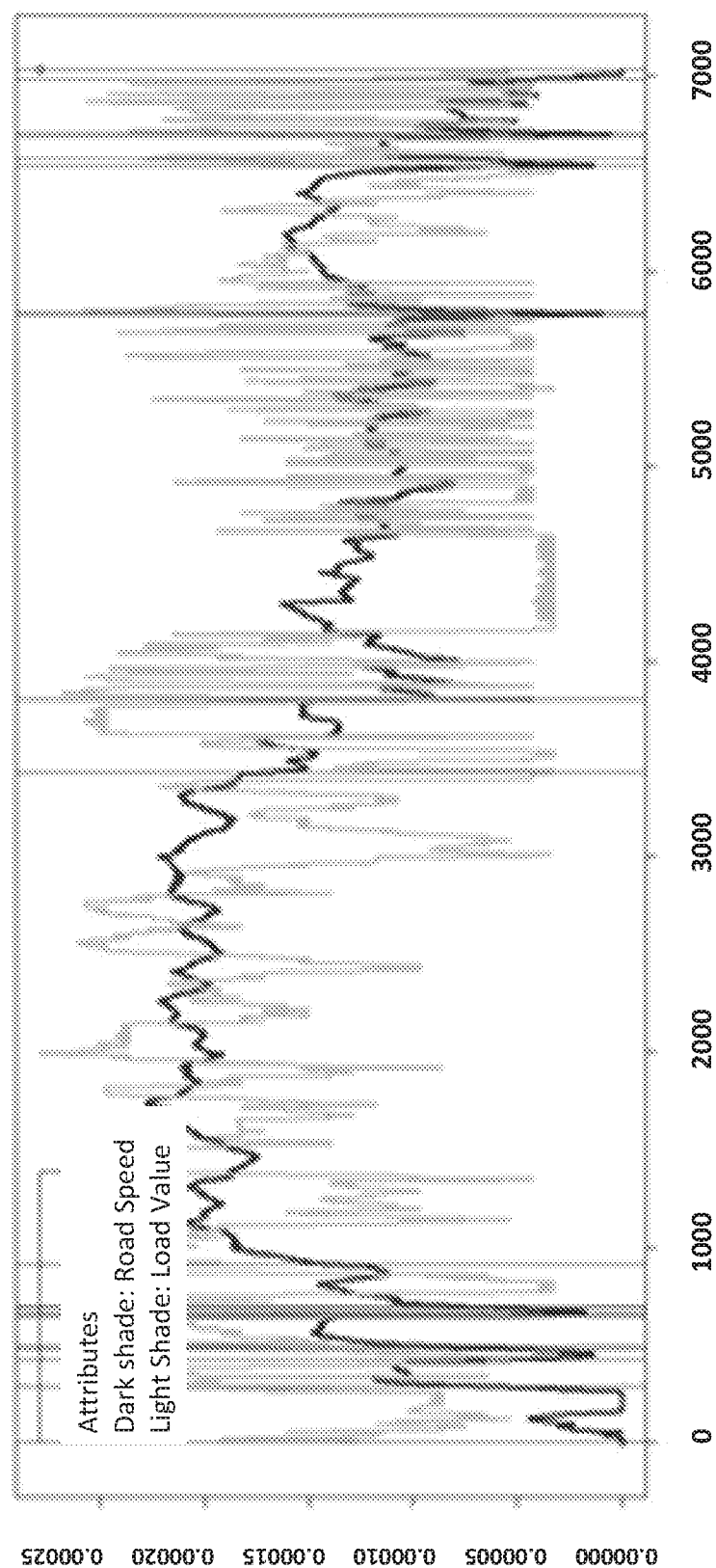
FIG. 10 is an example time series data of road speed and load value for a single commute.

FIG. 10 is an example time series data of road speed and load value for a single commute. FIG. 10 is an example time series data of road speed and load value for a commute with a relatively high performance score of 83.64, as obtained by the proposed analysis. FIG. 10 corresponds to an evening commute under smoother traffic conditions resulting in fewer segments and cluster transitions leading to a high score of 83.64.

Figure 11:
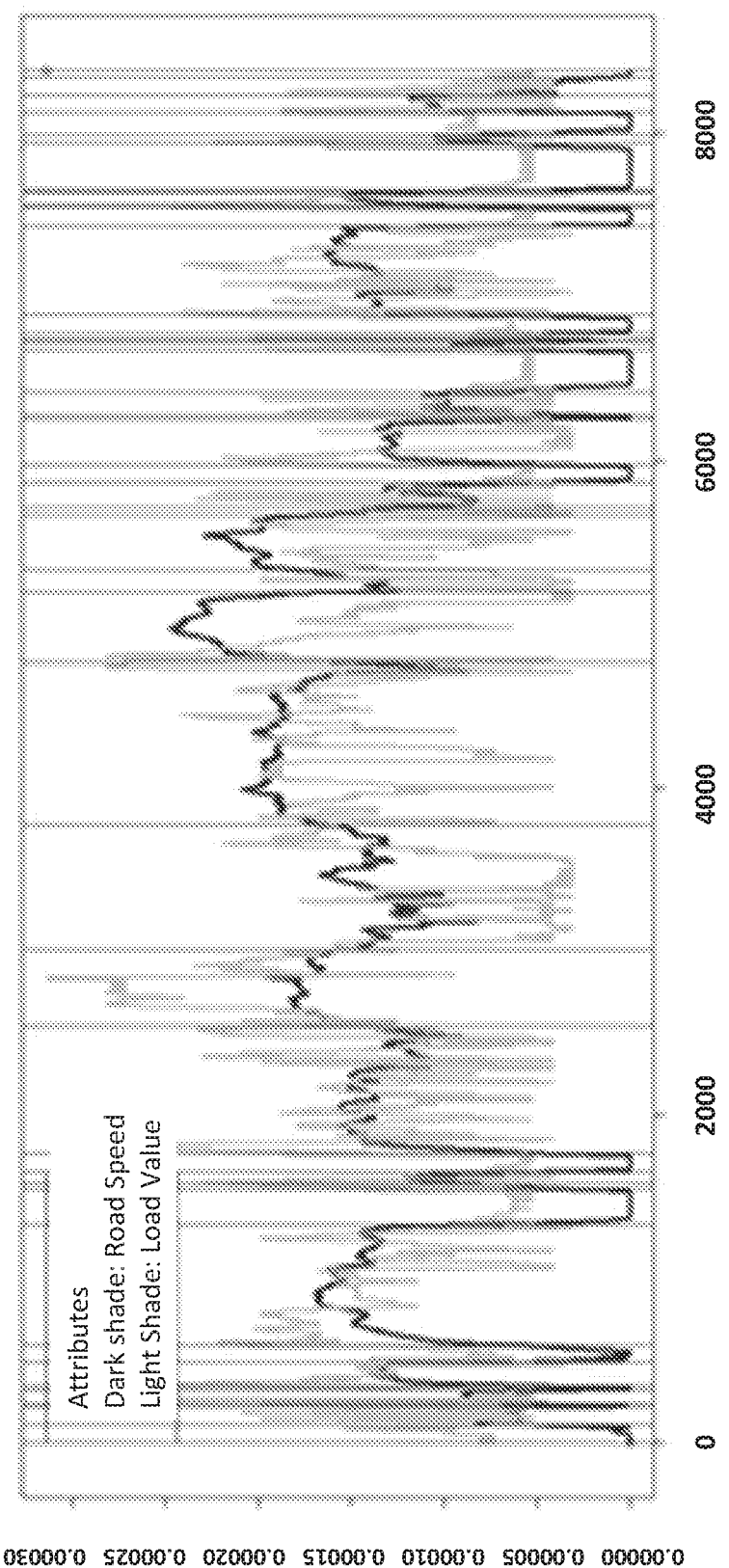
FIG. 11 is another example time series data of road speed and load value for a single commute.

FIG. 11 is another example time series data of road speed and load value for a single commute. FIG. 11 is another example time series data of road speed and load value for a commute with a relatively low performance score of 59.73. FIG. 11 corresponds to a morning, rush hour commute resulting in more aggressive driving behavior leading to a low score of 59.73.

In some examples, the cluster score for a given cluster may be automatically generated based on an identified pattern for the given cluster. For example, the cluster score for a given cluster may be automatically generated based on a medoid for the given cluster. Formally, let [minScore, maxScore] be a range of score values for all the segments. The scoring for each cluster may be based on analysis of the medoid of each cluster.

A threshold $V_{low}$ of low speed may be identified. All clusters with an average road speed below the threshold $V_{low}$ may be assigned a score range of [0,0], because the vehicle may be regarded as (nearly) stopped during the segment.

Scores may be associated with each time category. According to the process of segmentation, each segment may have a similar variance of road speed (below a threshold). Accordingly, a shorter length of segment may indicate more abrupt speed change during that time. Based at least in part on this, lower scores may be assigned to time categories with short segments. Let NT be a total number of time categories, and $T_i$ be a time category with an average length that ranks $i^{th}$ in all time categories. The score range for $T_i$ may be represented as $[minTScore_i, maxTScore_i]$, where $$\min TScore_i = (maxScore - minScore)*(i-1)/NT + minScore, \quad \text{(Eqn. 3)}$$

and $$\max TScore_i = (maxScore - minScore)*i/NT + minScore \quad \text{(Eqn. 4)}$$

Ranges for cluster score may be assigned to clusters of the time category for $T_i$. For clusters in a same time category, the one with higher average speed may be assigned a higher score, because it may be indicative of a better driving condition. Let $NC_i$ be the number of clusters in $T_i$. Clusters may be ranked according to their means of road speed. For the cluster $C_{ij}$ that ranks $j^{th}$ in $T_i$, if the average speed of this cluster is above $V_{low}$, range for the cluster score may be $[minCScore_{ij}, maxCScore_{ij}]$, where $$\min CScore_{ij} = (\max TScore_i - \min TScore_i)*(j-1)/NC_i + \min TScore_i, \quad \text{(Eqn. 5)}$$

and $$\max CScore_{ij} = (\max TScore_i - \min TScore_i)*j/NC_i + \min TScore_i. \quad \text{(Eqn. 6)}$$

Although the implementation example described herein is automotive specific, the systems and methods described herein is are applicable to other use cases. Generally, when the incoming data set has dynamic characteristics, autonomous evaluation of behavioral and/or operational characteristics of a system or entity may be performed, and a performance metric may be determined in relation to the observed data incoming data set.

With continued reference to FIG. 1, as described herein, the components of system 100 may be a combination of hardware and programming for performing a designated function. In some instances, each component may include a processor and a memory, while programming code is stored on that memory and executable by a processor to perform a designated function.

For example, training module 108 may include hardware to physically store the training time series data 104, and processors to physically process the training time series data 104 to generate the training model 108A. Also, for example, training module 108 may include hardware to physically store the trained model 108A. Training module 108 may also include software algorithms to process the training time series data 104 and share the trained model 108A over a network. Training module 108 may also include software algorithms to perform operations such as pre-processing, segmentation, clustering, and determining cluster scores. Training module 108 may also include software algorithms to automatically determine cluster scores based on cluster patterns. Training module 108 may include hardware, including physical processors and computer readable memory to house and process such software algorithms. Training module 108 may also include physical networks to be communicatively linked to the system of interest 102, and the performance testing module 116.

As another example, performance testing module 116 may include hardware to physically store the testing time series data 106, and processors to physically process the testing time series data 106 to determine the performance metric. Also, for example, performance testing module 116 may include hardware to physically store the trained model 108A received from the training module 108. Performance testing module 116 may also include software algorithms to process the testing time series data 104 and to perform operations such as pre-processing, segmentation, clustering, and determining cluster scores. Performance testing module 116 may also include software algorithms to automatically determine segment scores based on cluster scores for training clusters in the trained model 108A. Performance testing module 116 may also include software algorithms to determine the performance metric. Performance testing module 116 may include hardware, including physical processors and computer readable memory to house and process such software algorithms. Performance testing module 116 may also include physical networks to be communicatively linked to the system of interest 102, the training module 108, and the interface module 122.

Likewise, the interface module 122 may include software programming to receive the performance metric from the performance testing module 116. The interface module 122 may include hardware, including physical processors and memory to display a visual representation of the performance metric. For example, the interface module 122 may include an interactive graphical user interface. Also, for example, the interface module 122 may include a computing device to provide the graphical user interface. The interface module 122 may include software programming to interact with a domain expert and receive feedback related to, for example, cluster scores, and so forth. The interface module 122 may also include hardware, including physical processors and memory to house and process such software algorithms, and physical networks to be communicatively linked to the performance testing module 116 and to computing devices.

Figure 12:
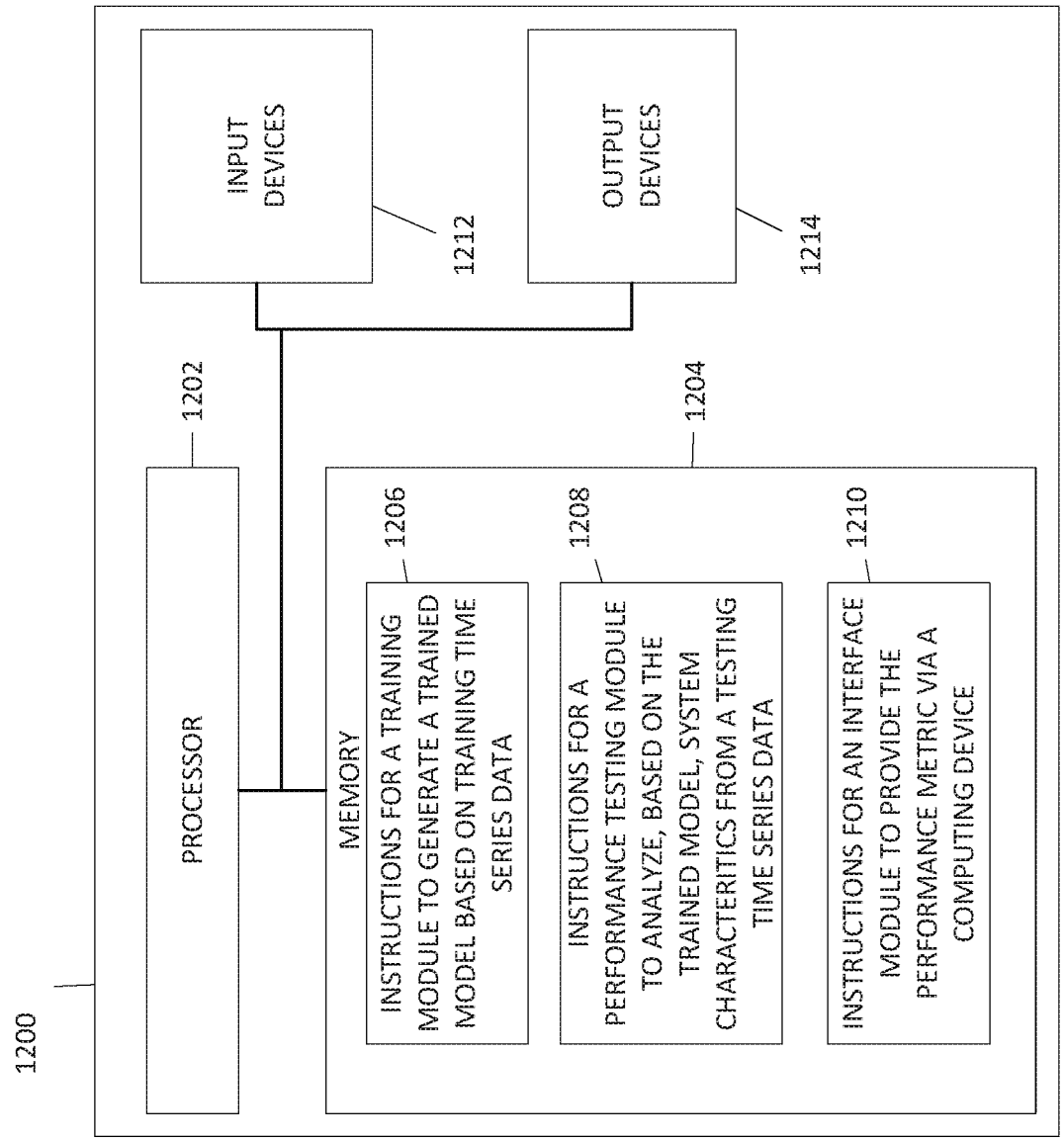
FIG. 12 is a block diagram illustrating one example of a processing system for implementing the system for performance testing based on variable length segmentation and clustering of time series data.

FIG. 12 is a block diagram illustrating one example of a processing system 1200 for implementing the system 100 for performance testing based on variable length segmentation and clustering of time series data. Processing system 1200 includes a processor 1202, a memory 1204, input devices 1212, and output devices 1214. Processor 1202, memory 1204, input devices 1212, and output devices 1214 are coupled to each other through communication link (e.g., a bus).

Processor 1202 includes a Central Processing Unit (CPU) or another suitable processor. In some examples, memory 1204 stores machine readable instructions executed by processor 1202 for operating processing system 1200. Memory 1204 includes any suitable combination of volatile and/or non-volatile memory, such as combinations of Random Access Memory (RAM), Read-Only Memory (ROM), flash memory, and/or other suitable memory.

In some examples, memory 1204 stores the trained model. In some examples, memory 1204 stores the training time series data and/or the testing time series data. In some examples, the trained model, training time series data, and/or the testing time series data may not be stored in memory 1204. Instead, they may be stored on servers external to the processing system 1200, and may be accessible to processor 1202.

Memory 1204 also stores instructions to be executed by processor 1202 including instructions for a training module 1206, instructions for a performance testing module 1208, and instructions for an interface module 1210. In some examples, training module, performance testing module, and interface module, include training module 108, performance testing module 116, and interface module 122, respectively, as previously described and illustrated with reference to FIG. 1.

Processor 1202 executes instructions for a training module 1206 to generate a trained model to learn characteristics of a system of interest from training time series data by segmenting the training time series data into homogeneous windows of variable length, clustering the segments to identify patterns, and associating each cluster with a cluster score. In some examples, processor 1202 executes instructions for a training module 1206 to pre-process training time series data received from a plurality of sources. In some examples, processor 1202 executes instructions for a training module 1206 to cluster the segments based on one of segment categorization and feature space transformation. In some examples, processor 1202 executes instructions for a training module 1206 to associate each cluster with labeled data.

Processor 1202 executes instructions for a performance testing module 1208 to analyze system characteristics from testing time series data by receiving the testing time series data, and determining a performance metric for the testing time series data by analyzing the testing time series data based on the trained model. In some examples, processor 1202 executes instructions for a performance testing module 1208 to generate additional segments of the testing time series data, associate each additional segment with a training cluster in the trained model, and associate each additional segment with a segment score based on the cluster score for the associated training cluster. In some examples, processor 1202 executes instructions for a performance testing module 1208 to determine the performance metric based on a weighted aggregate of the segment scores. In some examples, processor 1202 executes instructions for a performance testing module 1208 associate each segment with a segment score based on a variance of a load value.

Processor 1202 executes instructions for an interface module 1210 to provide the performance metric via an interactive graphical user interface. In some examples, processor 1202 executes instructions for an interface module 1210 to receive the cluster score from a domain expert via the interactive graphical user interface. In some examples, processor 1202 executes instructions for an interface module 1210 to automatically generate the cluster score based on predetermined rules. In some examples, such rules may be set by the domain expert.

Input devices 1212 include a keyboard, mouse, data ports, and/or other suitable devices for inputting information into processing system 200. In some examples, input devices 1212 are used to input a query term. For example, a user at a first hospital may interact with processing system 1200 via input devices 1212 to securely retrieve information associated with a second hospital. Output devices 1214 include a monitor, speakers, data ports, and/or other suitable devices for outputting information from processing system 1200. In some examples, output devices 1214 are used to provide the top k-similar second data terms.

Figure 13:
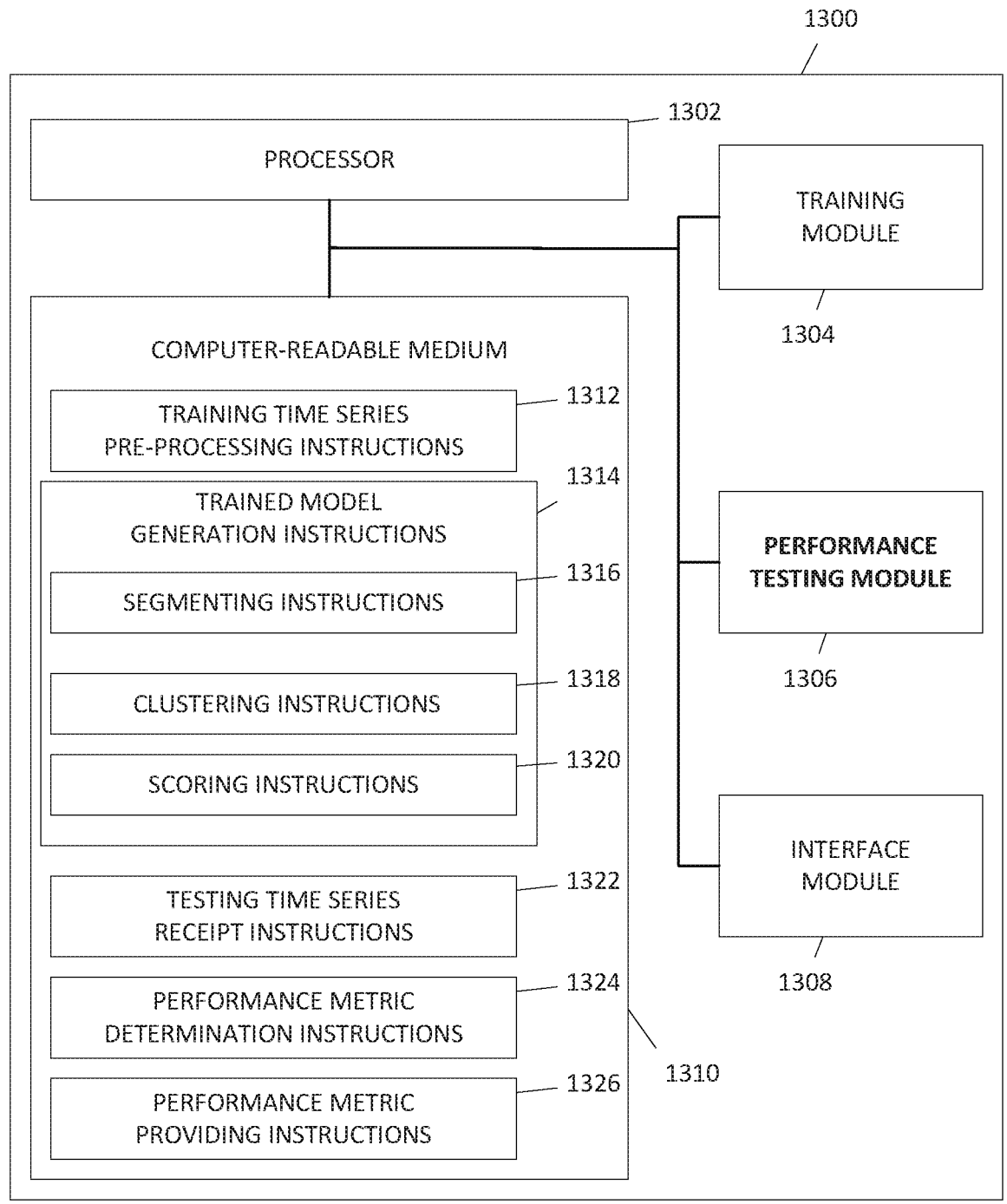
FIG. 13 is a block diagram illustrating one example of a computer readable medium for performance testing based on variable length segmentation and clustering of time series data.

FIG. 13 is a block diagram illustrating one example of a computer readable medium for performance testing based on variable length segmentation and clustering of time series data. Processing system 1300 includes a processor 1302, a computer readable medium 1310, a training module 1304, a performance testing module 1306, and an interface module 1308. Processor 1302, computer readable medium 1310, training module 1304, performance testing module 1306, and interface module 1308 are coupled to each other through communication link (e.g., a bus).

Processor 1302 executes instructions included in the computer readable medium 1310. Computer readable medium 1310 includes training time series pre-processing instructions 1312 of the training module 1304 to pre-process training time series data received from a plurality of sources.

Computer readable medium 1310 includes trained model generation instructions 1314 of the training module 1304 to generate a trained model based on the pre-processed training time series data. In some examples, computer readable medium 1310 includes trained model generation instructions 1314 of the training module 1304 to generate a trained model that includes a list of selected attributes, cluster properties, and cluster scores for each cluster. In some examples, computer readable medium 1310 includes segmenting instructions 1316 of the training module 1304 to segment, via a processing system, the pre-processed training time series data into homogeneous windows of variable length. In some examples, computer readable medium 1310 includes clustering instructions 1318 of the training module 1304 to cluster the segments to identify patterns. In some examples, computer readable medium 1310 includes scoring instructions 1320 of the training module 1304 to associate each cluster with a cluster score.

Computer readable medium 1310 includes testing time series receipt instructions 1322 of a performance testing module 1306 to receive testing time series data. In some examples, computer readable medium 1310 includes testing time series receipt instructions 1322 of a performance testing module 1306 to pre-process testing time series data received from a system of interest. In some examples, computer readable medium 1310 includes testing time series receipt instructions 1322 of a performance testing module 1306 to pre-process testing time series data based on one of data interpolation, data imputation, feature sub-selection, data fusion, validation, estimation, and editing.

In some examples, computer readable medium 1310 includes performance metric determination instructions 1324 of a performance testing module 1306 to determine a performance metric for testing time series data by analyzing the testing time series data based on the trained model. In some examples, computer readable medium 1310 includes performance metric providing instructions 1326 of an interface module 1308 to provide the performance metric via an interactive graphical user interface.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 1310 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 1300 are identified and refer to a combination of hardware and programming configured to perform a designated function. As illustrated in FIG. 13, the programming may be processor executable instructions stored on tangible computer readable medium 1310, and the hardware may include processor 1302 for executing those instructions. Thus, computer readable medium 1310 may store program instructions that, when executed by processor 1302, implement the various components of the processing system 1300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 1310 may be any of a number of memory components capable of storing instructions that can be executed by processor 1302. Computer readable medium 1310 may be non-transitory in the sense that it does not encompass a transitory signal but instead is made up of one or more memory components configured to store the relevant instructions. Computer readable medium 1310 may be implemented in a single device or distributed across devices. Likewise, processor 1302 represents any number of processors capable of executing instructions stored by computer readable medium 1310. Processor 1302 may be integrated in a single device or distributed across devices. Further, computer readable medium 1310 may be fully or partially integrated in the same device as processor 1302 (as illustrated), or it may be separate but accessible to that device and processor 1302. In some examples, computer readable medium 1310 may be a machine-readable storage medium.

Figure 14:
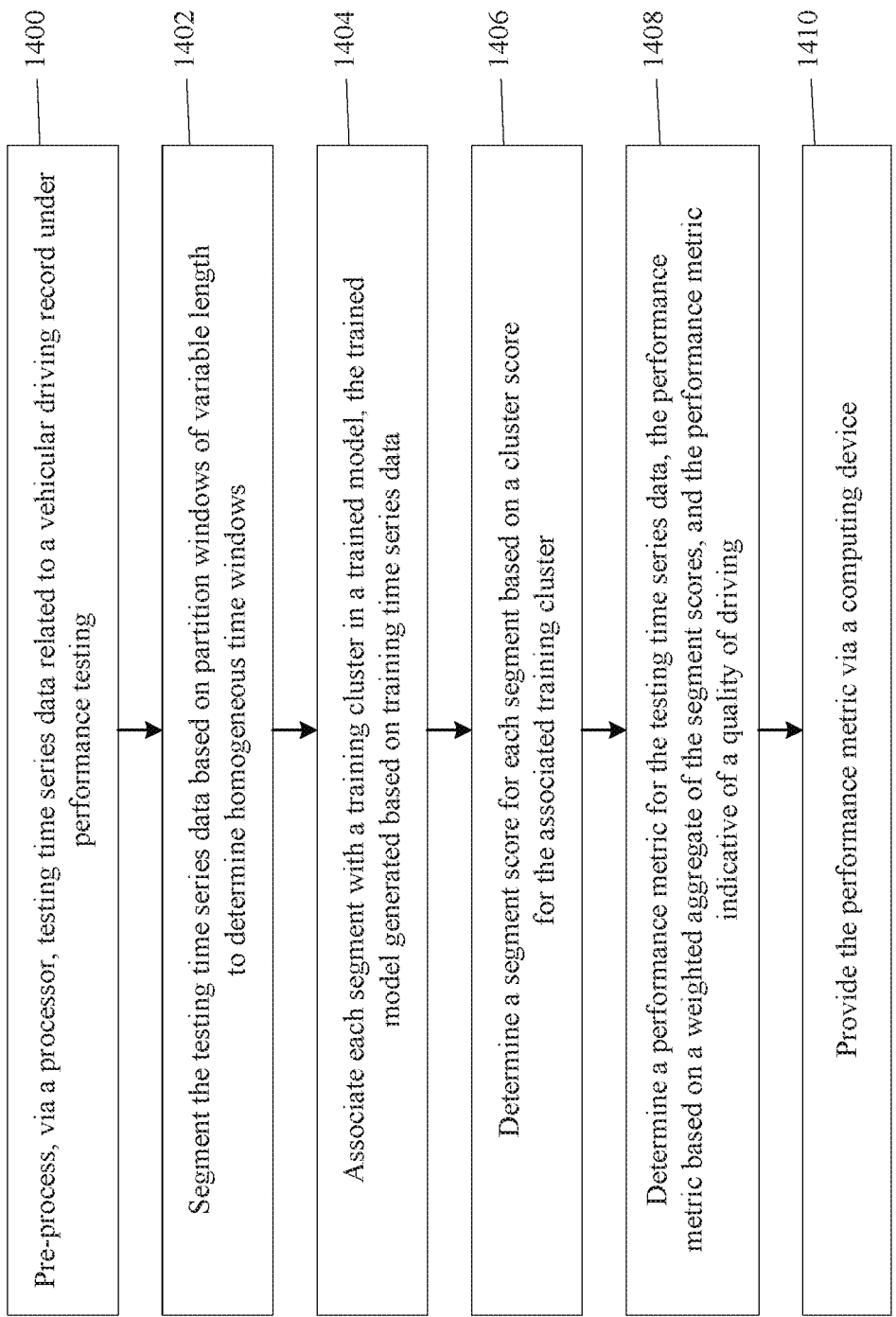
FIG. 14 is a flow diagram illustrating one example of a method for performance testing based on variable length segmentation and clustering of time series data.

FIG. 14 is a flow diagram illustrating one example of a method for performance testing based on variable length segmentation and clustering of time series data. At 1400, testing time series data related to a vehicular driving record under performance testing may be pre-processed. At 1402, the testing time series data may be segmented into homogeneous windows of variable length to determine homogeneous time windows. At 1404, each segment may be associated with a training cluster in a trained model, where the trained model is generated based on training time series data. In some examples, new, unseen, undetected, and/or anomalous patterns may be identified. At 1406, a segment score is determined for each segment based on a cluster score for the associated training cluster. At 1408, a performance metric for the testing time series data is determined, the performance metric based on a weighted aggregate of the segment scores, and the performance metric indicative of a quality of driving. At 1410, the performance metric is provided via an interactive graphical user interface.

In some examples, associating each segment with the training cluster may be based on a Euclidean distance of the segment to the training cluster in a feature space comprising labeled training data from the trained model.

In some examples, the training clusters may be based on durational partitions of the training time series data, and wherein associating each segment with the training cluster further comprises identifying a durational partition for the segment.

In some examples, the method may further include receiving the cluster scores from a domain expert via the interactive graphical user interface.

In some examples, the method may further include an automatic generation of a cluster score for a given cluster based on an identified pattern for the given cluster.

In some examples, pre-processing the training time series data may further include one of data interpolation, data imputation, feature sub-selection, data fusion, validation, estimation, and editing. In some examples, pre-processing the testing time series data may further include a combination of data interpolation, data imputation, feature sub-selection, data fusion, validation, estimation, and editing.

In some examples, the trained model may include one of a list of selected attributes, cluster properties, and cluster scores for each cluster.

Examples of the disclosure provide a generalized system for performance testing based on variable length segmentation and clustering of time series data. As described herein, the data-driven, automated system to analyze time-series data provides a performance metric by extracting and characterizing behaviors within the data.

Although specific examples have been illustrated and described herein, especially as related to numerical data, the examples illustrate applications to any dataset. Accordingly, there may be a variety of alternate and/or equivalent implementations that may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device comprising:
a processor; and
a memory storing instructions that are executable to cause the processor to:
receive training time series data from a system of interest,
segment the training time series data into segments of homogeneous windows of variable lengths, wherein each segment of the segments of homogeneous windows of variable lengths is a segment of the training time series data that contains values that are comparable with each other within a predetermined threshold of deviation,
cluster the segments into clusters,
associate each cluster of the clusters with a cluster score,
generate a trained model including the clusters and the cluster scores,
receive testing time series data from the system of interest,
determine a performance metric for the testing time series data by analyzing the testing time series data based on the trained model, and
generate, for display, the performance metric on an interactive graphical user interface.

2. The device of claim 1, wherein to cluster the segments into clusters, the instructions cause the processor to categorize the segments into a plurality of bins based on the variable lengths of the segments.

3. The device of claim 1, wherein the cluster score of each cluster is generated based on predetermined rules.

4. The device of claim 1, wherein the instructions cause the processor to pre-process the testing time series data based on one of data interpolation, data imputation, feature sub-selection, data fusion, validation, estimation, and editing.

5. The device of claim 1, wherein the instructions cause the processor to:
generate additional segments of the testing time series data;
associate each of the additional segments with one of the clusters in the trained model; and
associate each of the additional segments with a segment score based on the cluster score for the associated cluster.

6. The device of claim 5, wherein the performance metric is based on a weighted aggregate of the segment scores.

7. The device of claim 1, wherein characteristics of the system of interest include one of operational and behavioral performance of the system.

8. The device of claim 7, wherein the performance metric is a behavior scorecard for a vehicle driver.

9. The device of claim 8, wherein the instructions cause the processor to associate each cluster of the clusters with a cluster score based on a variance of a load value.

10. A method comprising:
receiving training time series data of a system;
segmenting, by a processor, the training time series data into segments of homogeneous windows of variable lengths, wherein each of the segments of homogeneous windows of variable lengths is a segment of the training time series data that contains values that are comparable with each other within a predetermined threshold of deviation;
clustering, by the processor, the segments into training clusters;
associating, by the processor, each of the training clusters with a cluster score;
generating, by the processor, a trained model including the training clusters and the cluster scores;
receiving testing time series data from the system;
determining, by the processor, a performance metric for the testing time series data based on the trained model; and
providing the performance metric via an interactive graphical user interface.

11. The method of claim 10, wherein determining the performance metric for the testing time series data based on the trained model comprises:
segmenting the testing time series data into segments of homogeneous windows;
associating each of the segments of the testing time series data with one of the training clusters in the trained model; and determining a segment score for each of the segments of the testing time series data based on one of the cluster scores in the trained model.

12. The method of claim 11, wherein determining the performance metric for the testing time series data is based on a weighted aggregate of the segment scores for the segments of the testing time series data.

13. The method of claim 12, wherein the segments of the testing time series data have variable lengths, and wherein the segment scores for the segments of the testing time series data are weighted based on the variable lengths of the segments.

14. The method of claim 10, further comprising: preprocessing the testing time series data based on one of data interpolation, data imputation, feature sub-selection, data fusion, validation, estimation, and editing.

15. A non-transitory computer readable medium comprising executable instructions to cause a processor to:
receive training time series data from a plurality of sources;
segment the training time series data into segments of homogeneous windows of variable lengths, wherein each segment of the segments of homogeneous windows of variable lengths is a segment of the training time series data that contains values that are comparable with each other within a predetermined threshold of deviation;
cluster the segments into training clusters;
associate each of the training clusters with a cluster score;
generate a trained model including the training clusters and the cluster scores;
receive testing time series data from a system of interest;
determine a performance metric for the testing time series data by analyzing the testing time series data based on the trained model; and
provide the performance metric via an interactive graphical user interface.

16. The non-transitory computer readable medium of claim 15, wherein to determine the performance metric for the testing time series data based on the trained model, the instructions cause the processor to:
segment the testing time series data into segments of homogeneous windows;
associate each of the segments of the testing time series data with one of the training clusters in the trained model; and
determine a segment score for each of the segments of the testing time series data based on one of the cluster scores in the trained model.

17. The non-transitory computer readable medium of claim 16, wherein the instructions cause the processor to determine the performance metric for the testing time series data based on a weighted aggregate of the segment scores for the segments of the testing time series data.

18. The non-transitory computer readable medium of claim 17, wherein the segments of the testing time series data have variable lengths, and wherein the segment scores for the segments of the testing time series data are weighted based on the variable lengths of the segments.

* * * * *